United States Patent [19]
Cretekos et al.

[11] Patent Number: 6,087,015
[45] Date of Patent: Jul. 11, 2000

[54] MATTE SURFACE FILM

[75] Inventors: George Forman Cretekos, Farmington; John Ralph Wagner, Jr., Rochester, both of N.Y.

[73] Assignee: Mobil Oil Corporation, Fairfax, Va.

[21] Appl. No.: 09/079,801

[22] Filed: May 15, 1998

[51] Int. Cl.[7] .................................................... B32B 27/32
[52] U.S. Cl. ........................ 428/447; 428/500; 428/515; 428/516
[58] Field of Search ................................ 428/447, 500, 428/515, 516

[56] References Cited

U.S. PATENT DOCUMENTS

| | | | |
|---|---|---|---|
| 4,487,871 | 12/1984 | Ishibashi et al. | 524/100 |
| 4,508,786 | 4/1985 | Ishibashi et al. | 428/461 |
| 4,692,379 | 9/1987 | Keung et al. | 428/349 |
| 4,883,698 | 11/1989 | Bothe et al. | 428/35.8 |
| 4,983,447 | 1/1991 | Crass et al. | 428/216 |
| 5,300,365 | 4/1994 | Ogale | 428/461 |
| 5,364,704 | 11/1994 | Murschall et al. | 428/516 |
| 5,436,041 | 7/1995 | Murschall et al. | 428/34.2 |
| 5,451,468 | 9/1995 | Seiler et al. | 428/515 |
| 5,891,555 | 4/1999 | O'Brien | 427/213 |

OTHER PUBLICATIONS

Japanese Patent Application Publication: 2668799 dated Jul. 4, 1997, *Official Gazette for Examiner Patents*.

*Primary Examiner*—Paul Thibodeau
*Assistant Examiner*—D. Lawrence Tarazano
*Attorney, Agent, or Firm*—D. P. Santini

[57] ABSTRACT

The invention is directed to a thermoplastic film having a matte surface comprising: a core layer of a thermoplastic polymer, the core layer having a first side and a second side, and a matte surface layer on a first side of the core layer, the matte surface layer comprising a blend of (i) a copolymer of ethylene and propylene or a terpolymer of ethylene, propylene and a $C_4$ to $C_{10}$ alpha-olefin or a propylene homopolymer; (ii) an ethylene polymer and (iii) a polydialkylsiloxane selected from the group consisting of (1) a polydialkylsiloxane having a number average molecular weight above about 250,000, typically above about 300,000 and a viscosity of above about 10,000,000 cSt, usually ranging from about 15,000,000 to about 20,000,000 cSt., and (2) a polydialkylsiloxane functionalized polyolefin. The external surface of the matte surface layer demonstrates a coefficient of friction ranging from about 0.1 to about 0.85 as determined by ASTM D1894 with an 18.14 kg (4 lb.) pound sled.

10 Claims, No Drawings

MATTE SURFACE FILM

FIELD OF THE INVENTION

The invention relates to a matte surface film. More precisely, the invention relates to a multilayer matte surface film having a low coefficient of friction and enhanced machinability.

BACKGROUND OF THE INVENTION

Matte surface films have a variety of useful purposes. Primarily, they form a good background for displaying printed or artful images on the film. The images can be printed onto the matte surface film by any conventional plastic printing process.

Mobil Chemical Company film product "70 MLT" is a matte surface biaxially oriented multilayer film. The base layer is oriented polypropylene and the matte surface skin layer comprises a mixture of polyethylenes and an ethylene-propylene-butene-1 terpolymer. The matte surface film has a dull surface appearance; that is, it is not shiny or glossy. Such a surface appearance is not typical of most biaxially oriented films used in packaging but is advantageous in that it provides an unusual appearance when reverse printed on the side opposite to the matte surface. The surface of such matte surface films is rough and can exhibit a high coefficient of friction which is undesirable in high speed film-forming machinery, or packaging printing equipment.

Machinability and processability of films is often related to the characteristics of the film surface which give it a low resistance to the relative motion of the film surface in contact with the film-forming machinery or packaging equipment. The matte surface texture can cause frictional resistance as the film is processed.

In U.S. Pat. No. 4,692,379, a film is described which has an upper heat sealable layer formed from an ethylene-propylene-containing copolymer or terpolymer and an antiblocking agent, the lower heat sealable layer is formed from an ethylene-propylene-containing copolymer or terpolymer and antiblocking agent and a quantity of silicone oil such that the coefficient of friction-reducing amount of the silicone oil will be present on an exposed surface of the upper heat sealable layer following mutual contact of the upper and lower surfaces. The silicone oil additive is described as having a viscosity of from about 350 to about 100,000 centistokes with about 10,000 to about 30,000 centistokes being preferred. An advantage of the invention as described in the '379 patent is that the silicone is present on the exposed surface of the lower layer in discrete microglobules which, to some extent, transfer to the upper surface upon contact. The silicone oil on the surfaces of the film facilitates machinability.

Japanese Patent Application Publication No. 2668799 describes a biaxially drawn multiple layer film characterized in that a surface layer of a composition comprised of components A and B are laminated on at least one surface of a biaxially drawn crystalline propylene polymer base layer. Component A is 100 parts by weight of at least one resin selected from a propylene-ethylene random copolymer of an ethylene content of 3 to 8 weight percent and a propylene-ethylene-butene-1 random copolymer of an ethylene content of 0.5 to 5 weight percent and a butene-1 content of 3 to 25 weight percent. Component B is 0.1 to 1.0 parts by weight of polydiorganosiloxane of a degree of polymerization n of 3500 to 8000. The film is said to have markedly improved adaptability to packaging machines and suitability for high speed automatic packaging equipment.

U.S. Pat. Nos. 4,487,871 and 4,508,786 disclose a polyolefin resin composition for metallized films having superior high-impact properties and heat-sealability which is obtained by blending a crystalline propylene-alpha-olefin copolymer containing 70% by weight or more of a propylene component and having a crystalline melting point of 150° C. or lower with a high density polyethylene having a density of 0.940 g/cm$^3$ or higher in blending ratios of 96 to 80% by weight of the copolymer and 4 to 20 percent by weight of the polyethylene.

None of U.S. Pat. Nos. 4,692,379; 4,487,871; 4,508,786 or JP 2668799 disclose a matte surface film or coefficient of friction problems associated with such film surfaces.

SUMMARY OF THE INVENTION

The invention is directed to a matte surface film, comprising:

(a) a core layer of a thermoplastic polymer, the core layer having a first side and a second side, (b) a matte surface layer on a first side of the core layer, the matte surface layer comprising a blend of (i) at least one of (1) a copolymer of ethylene and propylene or (2) a terpolymer of ethylene, propylene and a $C_4$ to $C_{10}$ alpha-olefin or (3) propylene homopolymer; (ii) an ethylene polymer and (iii) a polydialkylsiloxane selected from the group consisting of (1) a polydialkylsiloxane having a number average molecular weight above about 250,000, typically above about 300,000 and a viscosity of above about 10,000,000 cSt., usually ranging from about 15,000,000 to about 20,000,000 cSt, and (2) a polydialkylsiloxane functionalized polyolefin.

It is an object of the invention to produce a film having a matte surface layer which has a low coefficient of friction. It is a further object of this invention to achieve a matte surface film having improved processability.

It is a feature of the invention that a matte surface layer of a film which matte surface layer comprises a blend of (i) a copolymer of ethylene and propylene or a terpolymer of ethylene, propylene and a C4 to C10 alpha olefin or a propylene homopolymer and (ii) an ethylene homopolymer has an external surface which demonstrates a coefficient of friction ranging from about 0.1 to about 0.85 as determined by ASTM D-1894 with an 18.14 kg (4 lb.) sled.

It is a feature of the invention to have a matte surface layer which comprises a blend of thermoplastic polymers and an amount of a particular polydialkylsiloxane sufficient to lower the friction-creating characteristics of the matte surface and inhibit resin build-up on the die surfaces of the extruder; commonly referred to as "die drool".

It is an advantage of the invention that when the matte surface film is formed on high speed film-forming equipment and packaging machinery, it demonstrates improved machinability and processability.

In a particular aspect of the invention, the amount of the polydialkylsiloxane found to be sufficient to enhance machinability of the matte surface layer typically ranges from about 0.05 to about 10, specifically from about 0.1 to about 1, weight percent based on the entire weight of the matte surface layer.

DETAILED DESCRIPTION OF THE INVENTION

The thermoplastic polymer blend of the matte surface layer whose coefficient of friction is improved by this invention comprises a blend of incompatible polymers. In the instant invention, the polymer blend which has demonstrated effectiveness comprises a blend of (i) at least one of (1) a copolymer of ethylene and propylene or (2) a terpolymer of ethylene, propylene and a $C_4$ to $C_{10}$ alpha-olefin or (3) propylene homopolymer; and (ii) an ethylene polymer.

Typically the copolymer of ethylene and propylene and the terpolymer of ethylene, propylene and a $C_4$ to $C_{10}$ alpha-olefin are comprised, predominantly of propylene. Such copolymer or terpolymer, typically contains more than about 80% propylene. The ethylene polymer (ii) may be a copolymer. For example, specific comonomers contemplated include vinyl acetate, acrylic acid or a $C_4$ to $C_{10}$ olefin. The ethylene polymer may include a blend of different kinds of ethylene polymers. For example, the ethylene polymer may be a blend of two or more ethylene homopolymers each having different densities. In one embodiment that is contemplated the ethylene polymer comprises at least a first ethylene homopolymer having a density of at least about 0.91 g/cm$^3$ and a second ethylene homopolymer having a density which is different from the density of the first ethylene homopolymer. For example, the blend may comprise high density polyethylene and low density polyethylene or linear low density polyethylene. The ratio of the blend will vary depending upon the polyethylene components of the blend and the desired characteristics of the surface layer. In general, a blend in which an equal proportion of each component is employed, such as a 50:50 blend, may be useful. However, we have found a useful blend to be of 50% ethylene-propylene-butene-1 terpolymer, 40% high density polyethylene (0.95 g/cm$^3$) and 10% of a lower density polyethylene (approx. 0.92 g/cm$^3$).

Specific examples of useful polymer blends are described in U.S. Pat. Nos. 4,487,871; 4,508,786 or 5,451,468.

In U.S. Pat. Nos. 4,487,871 and 4,508,786 a film is described which is made from a blend of a crystalline propylene-alpha-olefin copolymer containing 70% by weight or more of a propylene component and having a crystalline melting point of 150° C. or lower with a high density polyethylene having a density of 0.940 g/cm$^3$ or higher in blending proportions of 96 to 80% by weight of the copolymer and 4 to 20% by weight of the polyethylene, the ratio of the melt flow rate of the polyethylene to the melt flow rate of the copolymer is equal to or greater than 0.7. Specific examples of the copolymers are ethylene-propylene copolymer, propylene-butene-1 copolymer and ethylene-propylene-butene-1 terpolymer. The high density polyethylene has a density of 0.94 g/cm$^3$ and may be a copolymer of ethylene, as a main component, and an alpha-olefin comonomer; for example, butene-1, pentene-1, hexene-1, heptene-1 or octene-1.

U.S. Pat. No. 5,451,468 discloses a packaging film with a sealable skin layer which is made from a mixture of from 50 to 80% by weight of a random terpolymer (I) of from 90 to 97% by weight of propylene, from 2 to 6% by weight of ethylene and from 1 to 6% by weight of a $C_4$ to $C_{10}$ alk-1-ene and from 20 to 50% by weight of at least one ethylene polymer (II). The term $C_4$ to $C_{10}$ alk-1-ene is preferred to mean but-1-ene, pent-1-ene, hex-1-ene, hept-1-ene, or oct-1-ene. The ethylene polymer component of the sealing layer is a homopolymer of ethylene and copolymer of ethylene with other comonomers included in the term. The preferred homopolymer is a low density or a high density polyethylene (density ranging from 0.890 to 0.980 g/cm$^3$). Suitable copolymers of ethylene are described as containing minor amounts of unsaturated comonomers, for example vinyl acetate or $C_3$-$C_{10}$-alk-1-enes, such as propylene, but-1-ene, hex-1-ene or oct-1-ene. A typical ethylene polymer has a density of from 0.900 to 0.935 g/cm$^3$.

The matte surface layer of the instant invention is usually made with a particular polydialkylsiloxane additive. The polydialkylsiloxane additive is especially selected because it reduces the friction between the matte surface and the machine surfaces with which the matte surface comes into contact during processing while maintaining the "matte" appearance of the film. The polydialkylsiloxane additive also reduces the accumulation of resin on the die surfaces during extrusion which minimizes this resin accumulation, commonly referred to as "die drool". This is useful because it reduces the frequency for die cleaning and the chance for film breakage.

It is contemplated that the incompatible blend of polymers of the matte surface layer results in "die drool" because the lower molecular weight materials migrate to the die surface and form a deposit which builds-up over time. It was discovered that the polydialkylsiloxane additive mitigates this effect.

In one embodiment, the film of this invention comprises a matte surface layer which demonstrates a coefficient of friction ranging from about 0.1 to about 0.85 as determined by ASTM D-1894 with an 18.14 kg (41b.) sled.

In another embodiment of the invention, the polymer blend of the matte surface layer is compounded with an amount of a polydialkylsiloxane sufficient to reduce friction when the film is formed or when it is manipulated in packaging machinery.

The polydialkylsiloxane of this invention can be more particularly defined as a polydialkylsiloxane selected from the group consisting of (1) a polydialkylsiloxane having a number average molecular weight above about 250,000, typically above about 300,000 and a viscosity of above about 10,000,000 cSt., usually ranging from about 15,000,000 to about 20,000,000 cSt., or (2) a polydialkylsiloxane functionalized polyolefin.

The alkyl group of the polydialkylsiloxane usually ranges from 1 to about 10 carbon atoms, more usually from 1 to about 3 carbon atoms, which carbon atoms can be in a straight or branched chain configuration.

When the polydialkylsiloxane is (2), a polydialkylsiloxane functionalized polyolefin, the polyolefin usually contains about 2 to about 4 carbon atoms which are usually in the form of a homopolymer. Typically, the polydialkylsiloxane is grafted onto a polypropylene backbone. However, a particularly useful polyolefin is polyethylene or polypropylene, although a copolymer, such as ethylene-propylene copolymer or ethylene-propylene-butene-1 terpolymer might be useful. A commercially available polydialkylsiloxane functionalized polyolefin which is useful in the films of this invention is available from DuPont under the trademark "Bynel" 2045-174-01.

One particular kind of polydialkylsiloxane used in this invention is referred to as "silicone gum", also described as an "ultra high molecular weight silicone". Silicone gum can be in the form of a silicone polymer dispersed in polypropylene. Silicone gum of this kind is available in a masterbatch form from the Dow Corning Corporation, of Midland Mich., under the product designation "MB50-001" which contains 50% silicone.

The ratio of polydialkylsiloxane to polymer blend of the matte-surface layer is, typically, very low and in an amount sufficient to improve machinability of the matte-surface layer. While the ratio of the polydialkylsiloxane to the polyolefin will vary, typically, depending upon the nature of the polydialkylsiloxane and the nature of the olefinic component, the polydialkylsiloxane content ranges from about 0.05 to about 10 weight percent, specifically about 0.1 to about 1 weight percent based on the total weight of the matte surface layer.

The polydialkylsiloxane of this invention provides a matte surface film which demonstrates a coefficient of friction ranging from about 0.1 to about 0.85 as determined by ASTM D1894 with an 18.14 kg (4 lb.) sled.

The core layer comprises a film-forming thermoplastic polymer which has properties suitable for extrusion or coextrusion followed by biaxial orientation in the machine and transverse directions under elevated temperature so as to form a film. Although, preferably, the thermoplastic polymer of the core layer is a propylene homopolymer, it can be any polymer made from a 2 to 4 carbon atom olefin, such as ethylene or butene-1 or a polymer made predominantly of propylene with a minor amounts of another olefin, usually a 2 to 4 carbon atom olefin.

On a surface of the core layer opposite to the matte surface layer there is a film-forming polymer having properties appropriate for extrusion and uniaxial or biaxial orientation (by stretching the extrudate in the machine direction and/or transverse direction under elevated temperatures) and for forming a skin layer on the outer surface of the core layer. Such a layer comprises a thermoplastic polymer which may be composed predominantly of an olefinic polymer such as propylene homopolymer, ethylene homopolymer, propylene or ethylene copolymer or terpolymer of propylene, ethylene and a $C_4$ to $C_{10}$ alpha-olefin. This thermoplastic polymer layer may be the same as the thermoplastic polymer of the matte surface layer or it may be copolymer or terpolymer of ethylene, propylene and butylene or another olefin having 5 to 10 carbon atoms or a mixture of these olefin polymers. Usually, when it is desirable for this layer to be printable or sealable or treatable for printing or sealing, it is comprised of an ethylene homopolymer having a density of about 0.91 to about 0.96 g/cm$^3$, ethylene-propylene copolymer in which the ethylene content is about 2 to 10% by weight based upon the total weight of the copolymer or an ethylene-propylene-butene-1 terpolymer in which the ethylene content is about 0.5 to about 7 weight % ethylene and about 5 to about 30 weight % butylene, each based upon the total weight of the terpolymer.

Sometimes it is useful to enhance film properties or provide the film with certain properties by use of appropriate film additives. Such additives are used in effective amounts, which vary depending upon the property required, and are, typically selected from the group consisting of antiblock, slip additive, antioxidant additive, moisture barrier additive or gas barrier additive.

Useful antistatic additives which can be used in amounts ranging from about 0.05 to about 3 weight %, based upon the weight of the layer, include alkali metal sulfonates, polyether-modified polydiorganosiloxanes, polyalkylphenylsiloxanes and tertiary amines.

Useful antiblock additives used in amounts ranging from about 0.1 weight % to about 3 weight % based upon the entire weight of the layer include inorganic particulates such as silicon dioxide, e.g. a particulate antiblock sold by W. R. Grace under the trademark "Sipernat 44", calcium carbonate, magnesium silicate, aluminum silicate, calcium phosphate, and the like, e.g., Kaopolite. Another useful particulate antiblock agent is referred to as a non-meltable crosslinked silicone resin powder sold under the trademark "Tospearl" made by Toshiba Silicone Co., Ltd. and is described in U.S. Pat. No. 4,769,418. Another useful antiblock additive is a spherical particle made from methyl methacrylate resin having an average diameter of 1 to 15 microns, such an additive is sold under the trademark "Epostar" and is commercially available from Nippon Shokubai.

Typical slip additives include higher aliphatic acid amides, higher aliphatic acid esters, waxes and metal soaps which can be used in amounts ranging from about 0.1 to about 2 weight percent based on the total weight of the layer. A specific example of a useful fatty amide slip additive is erucamide.

A conventional silicone oil additive having a viscosity of 10,000–60,000 cSt. is also contemplated.

Useful antioxidants are, generally used in amounts ranging from about 0.1 weight % to about 2 weight percent, based on the total weight of the layer, phenolic antioxidants. One useful antioxidant is commercially available under the trademark "Irganox 1010".

Barrier additives are used in useful amounts and may include low-molecular weight resins, hydrocarbon resins, particularly petroleum resins, styrene resins, cyclopentadiene resins and terpene resins.

Optionally, the outer layers are compounded with a wax for lubricity. Amounts of wax range from about 2 to about 15 weight % based on the total weight of the layer. Any conventional wax useful in thermoplastic films is contemplated.

The process of making the matte surface layer can be by masterbatch in which a minor proportion of a concentrated composition of polydialkylsiloxane and the matte surface thermoplastic polymer blend, along with any optional additives is prepared and mixed (usually by dry mixing) into a major proportion of the matte surface forming thermoplastic polymer blend. The amount of concentrate in the masterbatch usually ranges from about 5% by weight to about 50% by weight based on the total weight of the matte surface layer. The mixture is then melt mixed in an extruder or compounded in a twin screw extruder. Alternatively, the matte surface layer is prepared in one step by mixing the thermoplastic polymer, polydialkylsiloxane and, optionally, by any additives in the proportions used for making up the final matte surface layer composition.

Typically, the matte surface film is formed by coextruding the thermoplastic polymer core layer together with the matte surface layer and any additional layer through a flat sheet extruder die at a temperature ranging from between about 200 to about 250° C., casting the film onto a cooling drum and quenching the film. The sheet is then stretched about 3 to about 7 times in the machine direction (MD) orienter followed by stretching about 5 to about 10 times in the transverse direction (TD) orienter. The film is then wound onto a reel. Optionally, one or both of the external surfaces are coated and/or flame treated or corona treated before winding.

In general, the film of the instant invention comprises at least three layers: the core layer and the matte surface layer (usually the outermost skin layer) a layer which is on the other side of the core opposite to the matte surface layer (also usually the outermost skin later). It is contemplated that additional layers can be incorporated between the core layer and the outermost skin layers, e.g., tie layers comprising polypropylene or polyethylene. The core layer usually represents about 70 to about 90 percent of the thickness of the total film. The skin layers are usually coextensively applied to each major surface of the core layer, typically by coextrusion, as noted above. The skin layers may not, ultimately, be the outermost layers of a final film product which includes the matte surface film.

The film may be used as a packaging film or as a printed film. The film may be printed by any conventional means, contemplated printing means include letterpress, offset, silk screen, electrostatic and photographic methods. Specific printing methods contemplated include thermal dye transfer (including dye sublimation), lithographic printing, flexographic printing, gravure printing, hot stamping, valley printing, roll-leaf printing and spanishing. Polyolefins are normally treated before printing in order to make them receptive to inks. Treating methods include casing, electronic treating and flame treating.

INVENTION EXAMPLES AND COMPARATIVE EXAMPLE

In each of the examples, the coefficient of friction value was determined by ASTM D1894 with an 18.14 kg (4 lb.) sled instead of a 200 g sled.

Gloss was determined by ASTM D2457 at 45° gloss angle.

Die drool was determined by visually observing the die surface after extruding the matte surface forming thermoplastic blend for a period of time.

Example 1

A coextruded biaxially oriented three layer film was made having a core layer, of about 15 microns thickness, of polypropylene (commercially available from Fina under the product designation 3371) with two skin layers. The matte surface layer was about 1.75 microns in thickness and was made from a mixture of polyethylenes and a terpolymer of ethylene-propylene and butene-1. The mixture consisted essentially of 50% ethylene-propylene-butene-1 terpolymer, 40% high density polyethylene (0.95 g/cm$^3$) and 10% of a lower density polyethylene (0.92 g/cm$^3$). The outer skin layer on the side of the core layer which was opposite to the side of the core layer having the matte surface layer was propylene homopolymer compounded with an antiblock amount of antiblock particles. This compounded polypropylene was available commercially from Fina under the product designation 3371 T.

The matte surface layer was compounded with 0.4 weight percent, based on the entire weight of the matte surface layer of a high molecular weight silicone gum (having a polyethylene matrix) sold by Dow Corning under the product designation MB50-020 and 0.25 weight percent of a non-meltable crosslinked silicone resin powder, commercially available from Toshiba Silicone Company, Ltd. under the product name "Tospearl 145" (antiblock additive).

The melt streams emerging from both extruders were combined via an adapter system, applied one on top of the other in the form of layers and extruded via a slot die. The melt temperature in the main extruder was 245° C. and the side extruder was 225° C. to 240° C. The film was thereafter oriented by stretching under conditions typical for a three layer biaxially oriented film having a core layer of polypropylene. All layer thicknesses are based on the biaxially oriented film.

Example 2

A matte surface film was produced in substantially the same manner as described in Example 1 except that the "Tospearl 145" was replaced with silicone spheres sold by Shin Etsu under the product designation "KMP590".

Example 3

A matte surface film was produced in substantially the same manner as described in Example 1 except that the matte surface layer contained 0.2 weight percent high molecular weight silicone gum, 0.125 weight percent KMP590 silicone spheres and 0.125 weight percent Tospearl 145.

Example 4

A matte surface film was produced in substantially the same manner as described in Example 1 except that the matte surface layer contained 2.5% by weight, based on the weight of the matte surface layer, of a silicone gum, having a polypropylene matrix, sold commercially by Dow Corning under the product designation MB 50-001 and no antiblock additive.

Comparative Example 5

A matte surface film was produced in substantially the same manner as described in Example 1 except that the matte surface contained no high molecular weight silicone gum and no Tospearl 145. This film is commercially available from Mobil Chemical Company as 70 MLT.

Comparative Example 6

A matte surface film was produced in substantially the same manner as described in Comparative Example 4, except that the matte surface layer contained 0.25 weight percent of Tospearl 145.

Comparative Example 7

A matte surface film was produced in substantially the same manner as described in Comparative Example 4 except that the matte surface layer contained 0.25 weight percent of KMP590 silicone spheres.

Comparative Example 8

A non-matte surface film was made substantially as described in Example 1 except that the surface layer contained an ethylene-propylene copolymer (commercially available from Fina under the product designation 8573). The ethylene-propylene copolymer surface layer was compounded with 0.5 weight percent of the high molecular weight silicone masterbatch sold by Dow Corning under the product designation MB 50-001 and no other additives.

The following Table 1 reports the coefficient of friction (kinetic and static) and the gloss properties of the films of the invention and the comparative films.

TABLE 1

| Example No. | Coefficient of Friction (Static/Kinetic) | Gloss |
| --- | --- | --- |
| 1 | 0.358/0.321 | 10.3 |
| 2 | 0.366/0.342 | 10.1 |
| 3 | 0.500/0.452 | 10.7 |
| 4 | 0.148/0.151 | 8.1 |
| C5 | 0.781/0.543 | 11.3 |
| C6 | 0.700/0.523 | 10.4 |
| C7 | 0.706/0.537 | 10.3 |
| C8 | 0.345/0.235 | 90.0 |

The results of Table 1 show that the coefficient of friction was significantly higher for the matte surface films which were not made with the high molecular weight silicone gum in the matte surface layer.

From the gloss values reported in Table 1, it is apparent that the high molecular weight silicone gum did not detract from the "matte" appearance of the film.

To test processability, a film forming resin which was made from the matte surface thermoplastic blend described herein together with about 1% of the high molecular weight silicone gum was extruded from a die (Run 5). For comparison, the same matte surface thermoplastic blend without the high molecular weight silicon gum was extruded from the same die at various extrusion temperatures (Runs 1–4). The die was visually inspected for "die drool", the resulting observations are reported below in Table 2. The die build-up mentioned in Table 2 was observed at the exit mouth of the die.

TABLE 2

| Run | Die Temp. °F. (°C.) | Extruder Temp. °F. (°C.) | Die Drool Observations |
|---|---|---|---|
| 1 | 550 (288) | 550 (288) | Dark "whisker-like" build-up of polymer. First observed after Two hours |
| 2 | 400 (190) | 550 (288) | Polymer build-up darkened over time. Polymer build-up was on 0.25 of the strand circumference. Observed after 1.5 hours. |
| 3 | 400 (190) | 400 (190) | Similar build-up to Run 2, although the build-up was slightly heavier and encircled most of strand circumference. Observed over 1.5 hours. |
| 4 | 550 (288) | 400 (190) | Dark "whisker-like" build-up. First observed after 1 hour. |
| 5 | 550 (288) | 550 (288) | No build-up of polymer was evident, even after more than 6 hours. |

From the data reported in Table 2 it is apparent that an amount of the high molecular weight silicone resin gum added to the polymer blend of the matte surface layer substantially enhanced processability of the thermoplastic blend of the matte surface layer.

What is claimed is:

1. A matte surface film, comprising:
   (a) a core layer of a thermoplastic polymer, the core layer having a first side and a second side,
   (b) a matte surface layer on a first side of the core layer, the matte surface layer comprising a blend of (i) at least one of (1) a copolymer of ethylene and propylene or (2) a terpolymer of ethylene, propylene and a $C_4$ to $C_{10}$ alpha-olefin or (3) a propylene homopolymer; (ii) an ethylene polymer wherein the ethylene polymer is a blend of two or more different ethylene polymers and (iii) a polydialkylsiloxane selected from the group consisting of (1) polydialkylsiloxane having a number average molecular weight above about 250,000 and a viscosity of above about 10,000,000 cSt and (2) a polydialkylsiloxane functionalized polyolefin.

2. The matte surface film as claimed in claim 1 in which the ethylene polymer is a blend of at least a first ethylene homopolymer having a density of at least about 0.910 g/cm$^3$ and a second ethylene homopolymer having a density which is different from the density of the first ethylene homopolymer.

3. The matte surface film as claimed in claim 1 in which the ethylene polymer is a copolymer.

4. The matte surface film as claimed in claim 1 in which the amount of the polydialkylsiloxane ranges from about 0.1 to about 1 weight percent based on the entire weight of the matte surface layer.

5. The matte surface film as claimed in claim 1 in which the polydialkylsiloxane (iii) (1) has a number average molecular weight greater than about 300,000.

6. The matte surface film as claimed in claim 1 in which the polydialkylsiloxane (iii)(1) has a viscosity of from about 15,000,00 to about 20,000,000 cSt.

7. The matte surface film as claimed in claim 1 in which the matte surface layer consists essentially of a blend of 50% of an ethylene-propylene-butene-1 terpolymer, 40% of a high density polyethylene and 10% of a lower density polyethylene.

8. The matte surface film as claimed in claim 1 in which the blend of the matte surface layer comprises a blend of a crystalline propylene-alpha-olefin copolymer containing 70% by weight or more of a propylene component and having a crystalline melting point of 150° C. or lower with a high density polyethylene having a density of 0.940 g/cm$^3$ or higher in blending proportions of 96 to 80% by weight of the copolymer and 4 to 20% by weight of the polyethylene, the ratio of the melt flow rate of the polyethylene to the melt flow rate of the copolymer is equal to or greater than 0.7.

9. The matte surface film as claimed in claim 1 in which the blend of the matte surface comprises from 50 to 80% by weight of a random terpolymer (I) of from 90 to 97% by weight of propylene, from 2 to 6% by weight of ethylene and from 1 to 6% by weight of a $C_4$ to $C_{10}$ alk-1-ene and from 20 to 50% by weight of at least one ethylene polymer (II).

10. A film comprising a matte surface layer which comprises a blend of (i) a copolymer of ethylene and propylene or a terpolymer of ethylene, propylene and a $C_4$ to $C_{10}$ alpha-olefin or a homopolymer of propylene; and (ii) an ethylene polymer, wherein the ethylene polymer is a blend of two or more different ethylene polymers, the matte surface layer having an external surface which demonstrates a coefficient of friction ranging from about 0.1 to about 0.85 as determined by ASTM D1894 with an 18.14 kg (4 lb.) sled.

* * * * *

UNITED STATES PATENT AND TRADEMARK OFFICE
CERTIFICATE OF CORRECTION

PATENT NO. : 6,087,015
DATED : July 11, 2000
INVENTOR(S) : George Forman Cretekos; John Ralph Wagner, Jr. both of New York.

It is certified that error appears in the above-identified patent and that said Letters Patent is hereby corrected as shown below:

In the last line of the Abstract please delete "18.14 kg (4 lb.)" and insert therefore, -- 1.814 kg (4 lb.) --.

Column 2,
Line 45, please delete "18.14 kg (4 lb.)" and insert therefore, -- 1.814 kg (4 lb.) --.

Column 4,
Line 22, please delete "18.14 kg (4 lb.)" and insert therefore, -- 1.814 kg (4 lb.) --.

Column 5,
Line 7, please delete "18.14 kg (4 lb.)" and insert therefore, -- 1.814 kg (4 lb.) --.

Column 7,
Line 16, please delete "18.14 kg (4 lb.)" and insert therefore, -- 1.814 kg (4 lb.) --.

Column 10,
Line 50, please delete "18.14 kg (4 lb.)" and insert therefore, -- 1.814 kg (4 lb.) --.

Signed and Sealed this

Seventh Day of August, 2001

*Attest:*

NICHOLAS P. GODICI
*Attesting Officer*     *Acting Director of the United States Patent and Trademark Office*